United States Patent [19]
Vogler

[11] Patent Number: 5,560,641
[45] Date of Patent: Oct. 1, 1996

[54] SUSPENSION FOR LIGHT DUTY TRUCKS

[75] Inventor: Richard G. Vogler, Naperville, Ill.

[73] Assignee: The Boler Company., Itasca, Ill.

[21] Appl. No.: 511,256

[22] Filed: Aug. 7, 1995

Related U.S. Application Data

[63] Continuation-in-part of Ser. No. 287,203, Aug. 8, 1994, Pat. No. 5,464,245.

[51] Int. Cl.$^6$ .................................................. B60G 11/02
[52] U.S. Cl. ................................................. 280/720; 267/31
[58] Field of Search ............................ 280/720, 712, 280/688, 718, 711; 267/31, 52

[56] References Cited

U.S. PATENT DOCUMENTS

| | | | |
|---|---|---|---|
| 3,231,258 | 1/1966 | Brownyer et al. | 280/712 X |
| 3,309,107 | 3/1967 | Chieger | 280/124 |
| 3,334,913 | 8/1967 | Margala | 280/104.5 |
| 3,730,548 | 5/1973 | Thaxton | 267/31 X |
| 3,730,550 | 5/1973 | Thaxton | 267/31 |
| 3,785,673 | 1/1974 | Harbers, Jr. et al. | |
| 3,861,708 | 1/1975 | Fier . | |
| 4,099,740 | 7/1978 | McGee | 280/678 |
| 4,397,478 | 8/1983 | Jensen et al. | 280/718 |
| 4,494,772 | 1/1985 | Smith | 280/712 |
| 4,566,719 | 1/1986 | Van Denberg | 280/711 |
| 4,598,930 | 7/1986 | Smith | 280/712 |
| 4,699,399 | 10/1987 | Jable et al. | 280/680 |
| 4,711,465 | 12/1987 | Raidel | 280/712 |
| 4,856,812 | 8/1989 | Stephens et al. | 280/711 |
| 4,919,399 | 4/1990 | Selzer et al. | 267/31 |
| 4,993,729 | 2/1991 | Payne | 280/704 |
| 4,998,749 | 3/1991 | Bockewitz | 280/712 |
| 5,024,462 | 6/1991 | Assh | 280/712 |
| 5,046,752 | 9/1991 | Stephens et al. | 280/711 |
| 5,217,248 | 6/1993 | Reast | 280/718 |
| 5,228,718 | 7/1993 | Kooistra | 280/678 |
| 5,271,638 | 12/1993 | Yale | 280/712 |
| 5,346,247 | 9/1994 | Snyder | 280/720 X |

*Primary Examiner*—Robert J. Oberleitner
*Assistant Examiner*—Peter M. Poon
*Attorney, Agent, or Firm*—Lockwood, Alex, Fitzgibbon & Cummings

[57] ABSTRACT

A conventional form of vehicle axle suspension comprises on each side of a vehicle a leaf spring pack and a shock absorber system. According to this invention the leaf spring pack of a conventional suspension is replaced by a single-leaf leaf spring and an air spring. The opposite ends of the single-leaf leaf spring are shackled to the existing shackle attachments and their vehicle frame mounts. Midway between its ends the single-leaf leaf spring is connected to the adjacent axle end by the existing spring-to-axle attachment components. In order to compensate for the difference in thicknesses of a leaf spring pack and a single-leaf leaf spring at their mid-points, a spacer having an effective vertical thickness equal to the difference in the thicknesses is mounted on top of the single thickness spring at the axle. An air spring support bracket is mounted on the chassis frame member over the middle of a single-leaf leaf spring. The upper end of an air spring is attached to a support bracket and the lower end of the air spring is attached to the spacer. Except for the single-leaf leaf spring and the spacer, the other components may be of the type used in conventional leaf spring pack suspensions.

5 Claims, 2 Drawing Sheets

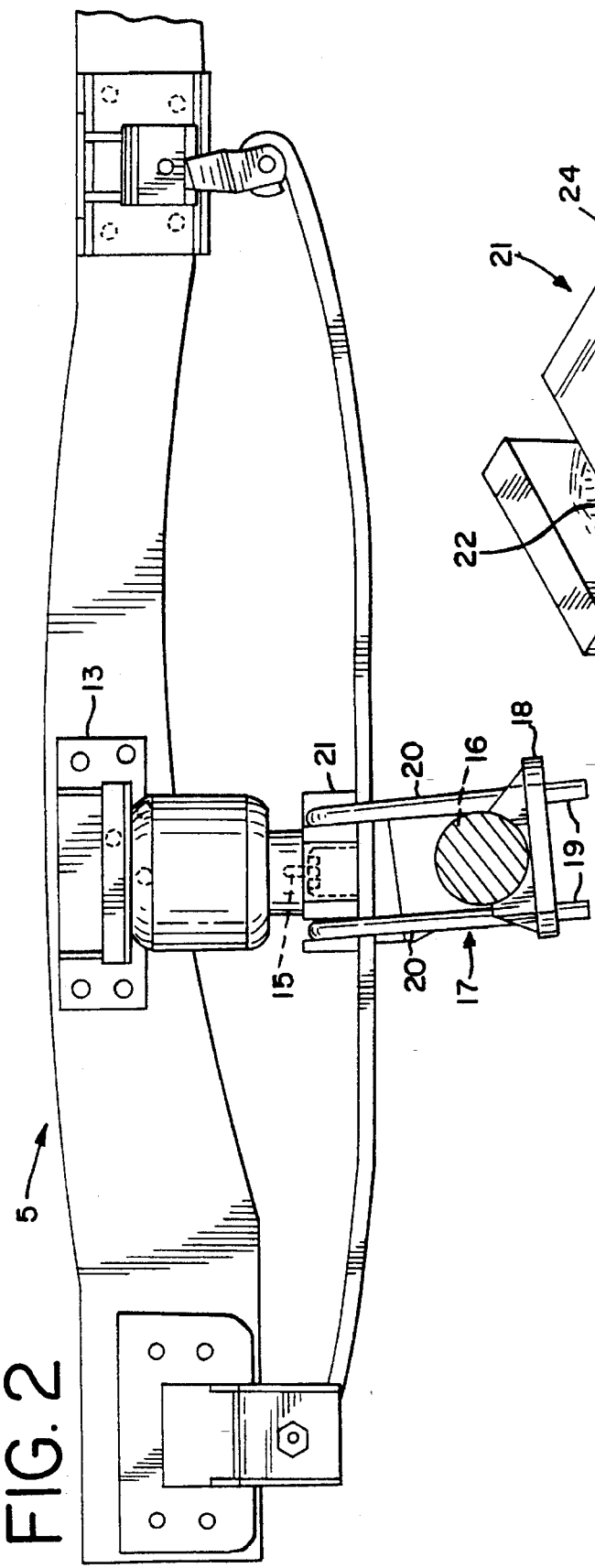
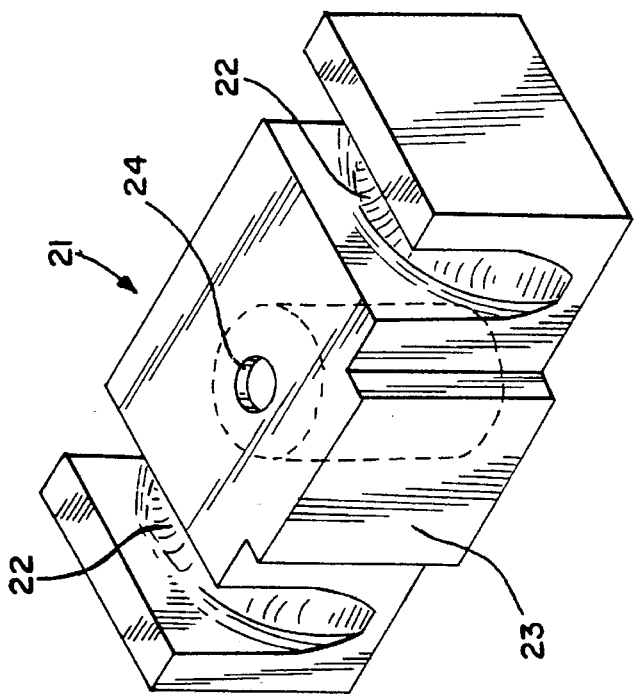
FIG. 2
FIG. 3

SUSPENSION FOR LIGHT DUTY TRUCKS

BACKGROUND AND DESCRIPTION OF THE INVENTION

This application is a continuation-in-part of application Ser. No. 08/287,203 filed Aug. 8, 1994, now U.S. Pat. No. 5,464,245 dated Nov. 7, 1995.

This invention relates, generally, to suspensions for light duty trucks and similar vehicles. The suspensions make use of two air springs and two single leaf springs together with shock absorber systems. More particularly, the invention relates to such suspensions which will replace conventional vehicle axle suspensions of the type combining a leaf spring pack of multiple leafs and a shock absorber system mounted on and below a fore-and-aft extending chassis frame member on each side of a vehicle, and with each leaf spring pack and its shock absorber system being attached to the adjacent end of an axle.

A suspension of the present invention can either be installed as original equipment on a vehicle such as a light duty truck or it may be installed to replace a conventional leaf spring pack of multiple leafs and shock absorber system on each side of a vehicle. In either case, the suspension of the present invention is unique in that it makes maximum use of (1) certain existing or already in place components used in a conventional vehicle axle suspension of the type combining a leaf spring pack of multiple leafs and a shock absorber system and of (2) existing air springs and related components which are standard in suspensions of the type that utilize air springs.

In the suspensions of the present invention single-leaf leaf springs provide the primary support for the load due to the empty vehicle and resist side thrusts and driving and/or braking torque end thrusts applied from the vehicle's axle. The two air springs, one on each side, provide the primary support for the portion of the total load which exceeds the load due to the vehicle when empty.

In view of the foregoing summary of the invention, it will be seen that the object thereof, generally stated, is the provision of a suspension for light weight trucks and similar vehicles that makes maximum use of conventional and standard components and known vehicle suspension designs and technology to provide a new, low-cost suspension system for light duty trucks and the like that addresses the user's concern for a softer ride through the entire range of empty and loaded vehicle conditions.

Certain other objects of the invention will be apparent to those skilled in the art from the following detailed description of the presently preferred embodiment taken in conjunction with the accompanying drawings wherein:

BRIEF DESCRIPTION OF THE DRAWINGS

FIG. 2 is a side elevational view of one side of the suspension of FIG. 1; and

FIG. 3 is an isometric view of one of two of the spacers used in the suspension of FIGS. 1 and 2.

Figure 1:
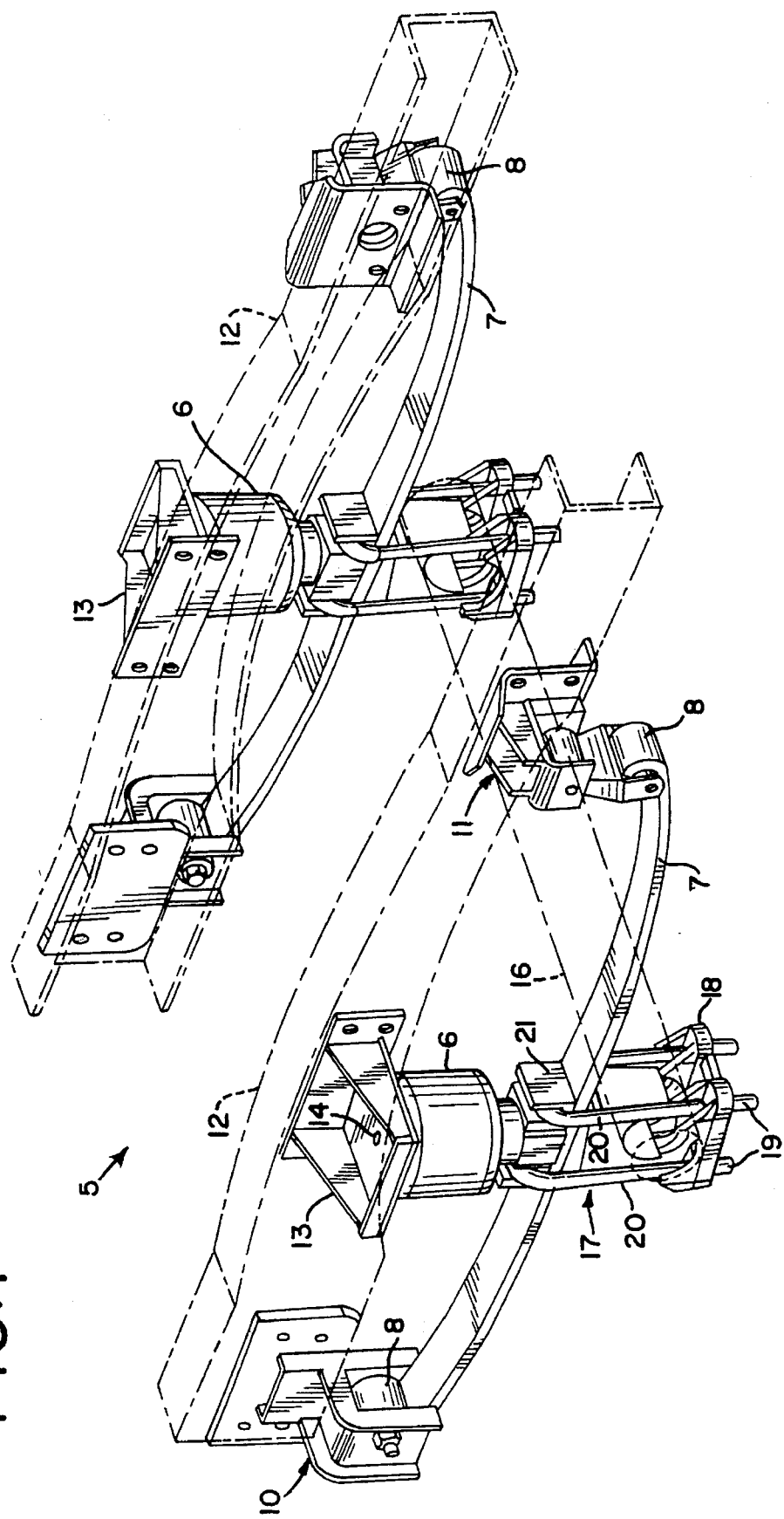
FIG. 1 is an isometric view of a suspension embodying the present invention for a vehicle such as a light duty truck.

Referring to the drawings, a suspension is indicated therein generally at 5. It will be seen and understood that the construction of this suspension on one side is duplicated on the opposite side of the vehicle. The active or functional components of the suspension 5 comprise two air springs 6—6 and two single-leaf leaf springs 7—7. Each single-leaf leaf spring 7 is provided with eyes 8—8 on opposite ends which are shackled to standard or existing shackle attachments indicated generally at 10 and 11 such as used for a leaf spring pack formed of multiple leafs. The shackle attachments or mountings 10 and 11 may have already been mounted on each fore-and-aft frame member 12 if the suspension 5 is being installed to replace an existing leaf spring pack suspension. If the suspension 5 is an original equipment suspension, then the shackle attachments 10 and 11, or their equivalents, will be mounted in the locations where they would normally be mounted for installing a conventional leaf spring pack.

An air spring support bracket 13 is mounted on each chassis frame member 12 at a location that is over one end of the vehicle axle 16 and over the middle of the single-leaf leaf spring 7 on that side. The attachment of each air spring 6 to its support bracket 13 is achieved by way of a stud 14. The lower end of each air spring 6 is attached to a spacer 21 mounted on each single-leaf leaf spring 7 by a bolt 15 (FIG. 2).

The mid-portion of each single-leaf leaf spring 7 is attached to the adjacent end of the axle or axle housing 16 by means of a conventional axle attachment assembly indicated generally at 17. This assembly comprises a bottom plate 18 suitably apertured to receive the lower ends 19 of shackle bolts 20—20 the bight portions of which clamp over a spacer 21 which rests on top of a single-leaf leaf spring 7. Preferably, the spacer 21 has grooves 22 (FIG. 3) at its opposite ends into which the bight portions of the shackles 20 fit. The effective vertical thickness of the spacer 21 measured to the base of the grooves 22 is such as to compensate for or equal the difference between the thickness of a replaced leaf spring pack of multiple leafs and the thickness of the single-leaf leaf spring 7. Thus, an existing or standard actual attachment 17 used with a leaf spring pack can be used in the suspension 5.

As mentioned above, the suspension 5 may be installed as part of the original equipment of a vehicle such as a light truck or it may be installed as a replacement for an original-equipment suspension in the form of a leaf spring pack and' shock absorber system.

The single-leaf leaf springs 7 will be of such design as to be the primary support for the load on the axle 16 when the associated vehicle is in its empty or unloaded condition. The two air springs 6 will, in turn, provide the primary support for the load on the axle 16 which is over and above the empty weight of the vehicle. The compressed air for the air springs 6 will be supplied by an electric motor driven air compressor (not shown) in accordance with known designs.

Referring to FIG. 3, the center of each space 21 is hollow as indicated at 23 and provided with an aperture 24 in the top wall for receiving the bolt 15 which secures the base of an air spring 6 to the spacer 21 and in turn the axle 16.

The components of the suspension 5 are known and already in use on suspensions in commercial use except for the single-leaf leaf springs 7 and the loaf-like spacers 21. Thus, kits for suspensions of the present invention are essentially readily available and installable at low cost making full use of known technology.

What is claimed is:

1. A kit for replacing a leaf spring pack used in vehicle axle suspensions of the type combining a leaf spring pack and a shock absorber system mounted on and below a fore-and-aft extending chassis frame member on each side of a vehicle with the leaf spring pack and shock absorber system being operatively attached to the adjacent end of an axle, said kit comprising a single-leaf leaf spring having an eye at each end for attachment to the in-place chassis frame mounts and shackle attachments as used for a leaf spring pack, a spacer to be positioned on top of said single-leaf leaf spring mid-way between its opposite ends and having an effective vertical thickness approximately equal to the difference between the vertical thickness of said leaf spring pack at its mid-point and the vertical thickness of said single-leaf leaf spring at its mid-point and having a fore-and-aft length sufficient to fit underneath and support the existing spring-to-axle attachment components which normally extend over the top of said leaf spring pack, an air spring support bracket to be mounted on said chassis frame member over the middle of said single-leaf leaf spring, an air spring, first fastener means for attaching the upper end of said air spring to said air spring support bracket, and second fastener means for attaching the lower end of said air spring to said spacer.

2. A kit as called for in claim 1 wherein said single-leaf leaf spring provides the primary support for the load on said axle on one side of the associated vehicle when said vehicle is in its unloaded condition and said air spring provide the primary support for additional load on the axle on said one side when said vehicle is in a loaded condition.

3. A suspension system for supporting one side of a vehicle chassis on one end of an axle, comprising, fore-and-aft rigid leaf spring mounting means attached to a side of a fore-and-aft extending chassis side frame member, a single-leaf leaf spring attached at its opposite ends to said leaf spring mounting means, axle attaching means attaching the end of an axle to said single-leaf leaf spring comprising a bottom plate engaging the underside of the axle and a pair of fore-and-aft spaced inverted U-shaped shackle bolts extending upwardly from said bottom with their bight portions extending over the mid-portion of said single-leaf leaf spring, a spacer resting on the middle of the said single-leaf leaf spring and underneath said bight portions and spacing said bight portions a distance (d) above the middle of said single-leaf leaf spring, an air spring support bracket mounted on said chassis side frame member over the middle of said single-leaf leaf spring, an air spring suspended from said air spring support bracket, and fastener means securing the lower end of said air spring to said single-leaf leaf spring, said fore-and-aft leaf spring mounting means, said axle attaching means, said air spring support bracket, said air spring and said fastener means all being of the type used in a conventional leaf spring pack suspension, and said distance (d) being approximately equal to the difference between the vertical thickness of the middle of a leaf spring pack and the vertical thickness of the middle of said single-leaf leaf spring.

4. The suspension called for in claim 3 wherein said spacer has grooves in its upper surface in which said bight portions are seated.

5. The suspension of claim 3 wherein a pair of said single-leaf leaf springs provides the primary support for the load on said axle when the associated vehicle is not loaded and a pair of said air springs provides the primary support for additional load on the axle.

* * * * *